United States Patent Office 3,379,504
Patented Apr. 23, 1968

3,379,504
START-UP PROCEDURE FOR FLUIDIZED PRODUCTION OF HYDROGEN USING A NICKEL-CONTAINING CATALYST
John C. Hayes, Palatine, Ill., assignor to Universal Oil Products Company, Des Plaines, Ill., a corporation of Delaware
No Drawing. Filed Mar. 26, 1965, Ser. No. 443,086
3 Claims. (Cl. 23—212)

ABSTRACT OF THE DISCLOSURE

In the production of hydrogen by the catalytic decomposition of methane utilizing a fluidized bed of $Ni-Al_2O_3$ catalyst, the improved start-up of the process operation to preclude nickel disassociation from the particles and clinker formation in the system which comprises, initially heating and thoroughly drying the catalyst particles prior to catalyst reduction, then subjecting the fluidized catalyst to a controlled mild reduction with a reducing atmosphere containing not more than about 25% free hydrogen.

---

The present application relates to a start-up procedure for effecting the fluidized production of hydrogen in a system using a nickel containing catalyst. In another aspect the invention is directed to the elimination of nickel separation in the start-up of a fluidized catalyst system for the production of hydrogen by the decomposition of a hydrocarbon stream in the presence of a subdivided nickel containing catalyst.

Hydrocarbon oils and gases, such as are readily and abundantly available as a result of petroleum processing, are an excellent source of hydrogen and a considerable number of processes have been designed to effect the conversion of said hydrocarbons to hydrogen. The normally gaseous hydrocarbons, such as methane, because of the high ratio of hydrogen to carbon, are considered to be a particularly attractive source of hydrogen. The decomposition of hydrocarbons to hydrogen and carbon has been effected at high temperature decomposition conditions in the presence of various supported Iron Group metals and in particular, nickel, seems to exhibit the best activity with respect to the decomposition of normally gaseous hydrocarbons to hydrogen.

In carrying out a continuous, hydrogen producing operation on a commercial scale, it is advantageous to utilize a fluidized or moving bed system to effect an efficient catalytic contact with the hydrocarbon stream. It is also of advantage to provide for the continuous fluidized transporting of the catalyst particles from the reaction zone to the regeneration zone for carbon removal and from the latter back to a reaction zone; however, it has been found that the nickel containing composites provide a problem of clinker formation in the system. All aspects of this clinker formation are not necessarily fully understood, although it is known that the agglomerations of metal-like fibrous material or clinkers that form in the system to block valves or other restricted flow points, will contain a high percentage of free nickel. In other words, it appears that there is a tendency for the disassociation or migration of nickel from the catalyst particles during the fluidized contacting procedure to produce hydrogen and a resulting clinker formation.

In prior associated work, it has been found that modifications in composition and/or preparation of catalyst can have a direct bearing upon the extent of nickel migration and the resulting clinker formation during the operation of a fluidized unit. For example, it has been determined that as the chloride level in the catalyst is increased, then the quantity of clinkers increases. Where aluminum chloride has been used as a source of alumina in the preparation of an all-alumina or high alumina base, there is, of course, some residual chloride in the composite. On the other hand, it has also been determined that the retention of some halogen through the spray drying stage is desirable or necessary for the preparation of all alumina supports that will have satisfactory attrition resistance. As a result, it appears that there may well be minimum washings and aging of the precipitated alumina as a necessary part of the preparation procedure in order to have some halogen retention for the obtention of a strong amorphous alumina structure.

In accordance with still further test work it has been found that nickel separation and clinker formation can occur very rapidly under certain start-up conditions. It appears that where the catalyst has not been thoroughly dried and where the reduction is effected rapidly, so as to cause a fairly rapid formation of water by the reduction reaction then there is a resulting rapid disassociation of nickel from the catalyst and the formation of fiber-like metallic particles of a high nickel content. Such results have determined that the reduction should be carried out in a gradual manner so that the water formation may be in turn gradually eliminated from the system without permitting any adverse effect on the catalyst which will accelerate nickel loss therefrom.

It has been the practice in connection with the start-ups of experimental laboratory sized fluidized hydrogen producing units to effect a circulation of catalyst in the system in the presence of a hot gaseous stream to bring it up to a desired high temperature suitable for effecting the hydrocarbon decomposition reaction, which will be of the order of 1400° F. to 1600° F. or more and then prior to cutting in the hydrocarbon charge stream providing for an initial reduction in the catalyst in the presence of a hydrogen containing stream. On the other hand, with pilot plant sized test units, it has been the practice to use methane as the reducing atmosphere. As a result of this work, it now appears that diluted methane may be used more satisfactorily than a hydrogen stream as the reducing atmosphere for the catalyst in the system. However, even where methane is used for the reduction step and there is a quick switch-over from the heating gas stream, without any attempt to effect a diluted or slow introduction of the reducing atmosphere into the presence of the circulating catalyst particles, then there will be clinker formation in the unit. Actual operations have shown that where there has been this rapid introduction of the reducing stream into the circulating catalyst system, there has been found a substantial nickel separation and the resulting formation of fibrous mats or clinker-like material. For example, in one test operation, there was a separation of nickel to form a mat of metallic fibers within the first five minute period after hydrogen was cut into the catalyst circulation within the system as the means for effecting the initial reduction of the catalyst, prior to effecting a methane conversion to hydrogen and carbon. In other instances of test operations, there have been start-up procedures where the catalyst circulation seems to perform as if the material were of a sticky nature and would cause erratic flow. In other words, during the period of erratic operation, the circulation of particles seems to be hindered within the unit. Also during such erratic periods, there has been found the presence of water condensate in the effluent, although it does not seem that at the high temperature conditions involved there would be sufficient moisture actually present on the catalyst particles which would be effective to in any way hinder catalyst circulation. In any event, it appears that the presence of excess hydrogen in an initial start-up and reduction period will cause the rapid formation of water and result in nickel migration and clinker formation in the system.

In an earlier concept of the problem of nickel migration, it was thought that carbon must be present in order to permit the formation of an intermediate stage of nickel carbonyl which in turn would lead to the disassociation or migration of nickel into high nickel content clinkers and fibrous material.

However, it now appears that such early concept was in error and that both the chloride content of the catalyst and water formation in the system appear to be critical factors. It is now thought that there may be nickel separation from the catalyst while chloride or other volatile acidic elements are leaving the catalyst. Thus, the presence of water would be expected to accelerate the rate of chloride volatilization and in turn provide for accompanying nickel separation. Conversely, with the absence of water, the chloride loss would occur at a slower rate and presumably result in less nickel separation.

It is a principal object of the present invention to provide for the elimination of clinker formation in the start-up of a hydrogen producing unit, where there is a nickel containing catalyst used therein, by minimizing the presence of free hydrogen in effecting the initial catalyst reduction and start-up procedure and thus precluding the formation of any large quantity of water in the presence of the catalyst during the reduction step.

Another object of the present invention is to provide a start-up procedure which minimizes the effect of water by providing for a thorough drying of the nickel containing catalyst before the reducing stream is introduced into the presence of the high temperature catalyst and, in addition, effecting a gradual reduction of such catalyst by utilizing a diluted hydrogen containing stream or by using a hydrocarbon stream, such as methane, which also may be diluted and which will in turn result in a lesser concentration of hydrogen in the presence of the catalyst during the reducing period.

Broadly, the present invention may be considered to provide in connection with a processing system for producing hydrogen by the fluidized contacting of a normally gaseous hydrocarbon stream at decomposition conditions with subdivided catalyst particles containing nickel, the improved start-up procedure to preclude nickel disassociation from the particles and clinker formation in the system, which comprises, effecting an initial heating and drying of the catalyst particles prior to the reduction thereof, and maintaining a fluidized contact of the catalyst particles in the system at reducing conditions with a reducing stream selected from the group consisting of a normally gaseous hydrocarbon vapor, a gaseous hydrocarbon-inert gas mixture, and a gaseous mixture of an inert gas and from about 5% to about 20% hydrogen.

In a preferable operation, methane or other light normally gaseous hydrocarbon stream that is diluted with an inert gas is used as the reducing medium for the nickel catalyst prior to introducing the hydrocarbon charge stream to the unit to produce hydrogen and carbonaceous material. In other words, the hydrocarbon stream provides for a lesser amount of hydrogen to be present in contacting the catalyst particles during the reduction step so that in turn there is a lesser amount of water formation to permit chloride volatilization and nickel migration. On the other hand, in a small unit where it is the practice to utilize hydrogen as a reducing medium, then it is, of course, possible to provide a gas mixture providing a diluted hydrogen stream such that there may be a gradual reduction of the catalyst particles and a minimization of clinker formation. For example, a diluted stream providing from about 1 to 25 percent hydrogen may be used for a one or two hour period in effecting a first phase of catalyst reduction and a subsequent phase or step utilizing a hydrogen containing stream which may have 50 percent or more free hydrogen present to carry out the completion of the reducing step prior to cutting in the hydrocarbon stream.

Actually, various support materials may be used for preparing a nickel containing catalyst; however, a high alumina content base or an all-alumina base for the catalyst is preferred to silica-alumina or other typical catalyst support materials. Prior associated work has shown that the over-all activity is best with the high alumina content, with such activity being in part the result of an independent effect exerted by the alumina oxide or by reason of a particular effect of the alumina with the nickel as the preferred active component. Thus, as used herein, the term "alumina" shall be a base material which is at least about 95% alumina. Alumina as a catalyst support may be synthetically prepared or may be of a naturally occurring alumina, such as recovered from bauxite. Synthetically prepared alumina may be of the gel type generally prepared by precipitation methods: for example, an alkaline reagent such as ammonium hydroxide, ammonium carbonate, etc., is commingled with an acidic solution of an aluminum salt which may be an aqueous solution of aluminum chloride, aluminum sulfate, aluminum nitrate and the like, to precipitate the desired alumina. Alternatively, alumina may be precipitated by commingling hydrochloric acid, sulfuric acid, nitric acid or the like, with an alkaline solution of a suitable aluminum salt such as sodium aluminate, potassium aluminate, etc. However, it should be pointed out that alumina from varying sources can materially affect strength or attrition resistance of a finished catalyst. For example, alumina prepared by sodium aluminate resulted in a physically weak catalyst and high attrition losses in a fluidized test unit.

Inasmuch as the alumina base for a nickel containing hydrocarbon decomposition catalyst is generally prepared from an aluminum chloride starting material, the resulting finished base will have some residual chloride content; however, as noted hereinbefore, since such chloride content has a deleterious effect upon nickel migration, then the preparation should be regulated to permit only a relatively low chloride content. For example, the chloride ion content in a preferred catalyst shall generally not be more than 0.05% to 1% by weight of the base material in the finished catalyst after calcination. Thus, preferably, a hydrogel prepared by precipitation from an aluminum chloride solution shall be washed and filtered several times to reduce the chloride concentration to the desired level consistent with attrition resistance aspects. Since it is recognized that some chloride content appears to slow crystallite formation in the structure and effect greater attrition resistance in the finished catalyst, the chloride content should not be entirely removed and may be retained to the level of approximately 0.50 percent by weight of the base material without unduly effecting nickel separation, as long as the start-up procedure is carried out in accordance with the present invention so as to preclude excessive water formation in the initial reducing and start-up operation.

The nickel content of the improved catalyst of this invention may be obtained by impregnating the alumina or alumina-nickel suport with a suitable aqueous solution of a nickel salt, such as, for example, nickel nitrate, nickel formate or an acid salt such as nickel chloride and nickel sulfate with an ammoniacal solution which will convert the salt to the metal oxide, followed by heating to drive off the volatile components. There may be successive soakings of the support into the impregnating solution or there may be a continuous soaking for a period of one or more hours until the particular type of support acquires the desired amount of the active metal component which will be retained after rinsing and drying of the composite.

However, associated work has shown that good activity and improved attrition resistance is obtained by the procedure of adding the nickel salt solution to the slurry feed of alumina hydrogel such that the catalyst particles are comminuted or spray dried to contain the nickel salt. For example, a nickel nitrate solution is incorporated into the alumina hydrogel to form an alumina-nickel hydrogel slurry stream which will generally provide from about 5% to 20% nickel by weight of the finished calcined catalyst particles. For some reason, with the nickel added to the slurry stream ahead of the spray drier, there is better attrition resistance to the finished catalyst than when the particles are impregnated by being soaked in a nickel solution.

With respect to fines in the microspherical catalyst particles used in the fluidized system, there does not seem to be any particular effect or correlation between the large amount of fines in the material causing increased nickel migration or disassociation from the catalyst particles. For example, certain test operations were carried out in laboratory test units where fines that were less than 270 mesh size were removed from a sample and such sample compared with a catalyst sample having particles of the 270 mesh size and smaller. It appeared that the coarse fraction resulted in some clinker formation, while the catalyst with the extra fine material effected no clinker formation after 16 hours of test using a methane contact alternately with an oxidizing stream of air.

The following examples are presented to illustrate the results obtained with respect to clinker formation from various initial reduction or start-up procedures in a fluidized system.

All of the measuring for clinker formation in the following examples was carried out in a laboratory activity test unit which comprised a quartz reactor, sized approximately 2 inches in diameter by 8 inches in length. This unit is adapted to handle approximately 40 cc. of microspherical catalyst particles in contacting a methane charge stream in a fluidized manner. In all instances, the methane was introduced into the reactor at a gaseous hourly space velocity of about 6150 to effect the contacting of the catalyst at about 1600° F. In the cyclic operations, the methane contact was for a period of 24 seconds, subsequently, the catalyst particles were subjected to a nitrogen purge stream for approximately 12 seconds and then subjected to oxidation by an air stream for approximately a 52 to 60 second period of time so as to effect the substantial removal of carbon from the catalyst particles. This regeneration step was also followed by a nitrogen purge stream for an approximate 30 second period.

For all of the tests, an alumina-nickel catalyst was used that had been prepared by forming an alumina hydrogel by the precipitation thereof from aluminum chloride with ammonium hydroxide. The water washed and filtered hydrogel was reslurried for feeding into a spray drier and catalyst formation. A nickel nitrate solution was added to the slurried alumina ahead of the spray drier to provide approximately 7% nickel content, by weight of the finished catalyst. Thus, the particles contained the desired nickel content as they left the spray drier and prior to calcination. The spray dried particles were subsequently calcined in the presence of air at an elevated temperature of the order of 1200° F. prior to being used in the test procedures. As will be noted in various of the examples, for comparison purposes, certain of the catalyst samples had a residual chloride content of 0.79 percent by weight of the composite, while in certain of the examples, the chloride content was 1.25 percent by weight of the composite.

EXAMPLE I

In one test operation, 40 cc. of the aforedescribed catalyst, which consisted of an alumina base with approximately 7% nickel and 0.79% chloride content in the finished composite, was loaded into a pre-heated reactor maintained in a furnace block. The catalyst was then reduced in situ with hydrogen for a one hour period at 1600° F. The unit was then shut down and the catalyst removed for an examination to determine clinker formation. In this instance, there was found 176.5 mg. of high nickel content clinker formation.

EXAMPLE II

In another test operation using the same type of catalyst as described in Example I, there was carried out a 6 hour catalyst drying operation at 1600° F., using nitrogen to contact and fluidize the catalyst. Following the six hour drying period there was a one hour reduction step in the presence of hydrogen at 1600° F. Upon removing the reduced catalyst and examining for clinker content there was found to be 43 mg. of clinker formation.

EXAMPLE III

In this test operation, with the same type of catalyst as previously used, there was effected a one hour reduction of the catalyst in the presence of hydrogen at 1600° F. followed by a five minute further reduction in the presence of methane. An examination of the thusly reduced catalyst provided 88 mg. of clinker formation.

EXAMPLE IV

In this test operation, with the catalyst being of the same type as set forth in the prior examples, there was a one hour period of hydrogen reduction at 1600° F. and a five minute cycling operation. The cycling sequence consisted of repetitive methane contact, nitrogen purge, air reduction and nitrogen purge, as described hereinbefore. In this instance, the thusly reduced catalyst provided 67 mg. of clinker formation.

EXAMPLE V

In this test operation, with a catalyst of the same type, there was a reduction in the presence of perfluent methane alone at 1600° F. for a 15 minute period. The catalyst in this instance showed no clinker formation whatever.

EXAMPLE VI

In this test operation, with the catalyst being of the same composition as used in the prior examples, there was an eight hour period of cycling operation as heretofore described, with no free hydrogen being used in an initial reducing operation. Examination of the catalyst particles following this long period of cycling procedure, and the slow reduction resulting from the methane used in the cycle, there was found to be no clinker formation.

EXAMPLE VII

In this test operation, an alumina-nickel composite was utilized which contained approximately 7% nickel and 1.25% chloride content. In other words, the catalyst was similar to that used in the prior examples except for the higher chloride content in the finished composite. An initial in situ reduction in the presence of free hydrogen was carried out for a one hour period at 1600° F. with the result that there was large mass of clinker formation contained in the test reactor. Actually, the clinker was about 1½" in diameter and contained some particles of catalyst which could not be readily removed so that there was no actual weight measurement taken.

EXAMPLE VIII

In another test operation, utilizing the same type of catalyst as used in Example VII, there was carried out a predrying step for a six hour period at 1600° F. in the presence of a fluidizing stream of nitrogen. The drying step was followed with one hour of hydrogen reduction at 1600° F. In this instance the examination of the catalyst removed from the reactor showed 774 mg. of clinker formation.

EXAMPLE IX

The present test operation, using a catalyst similar to that of the previous test operation, subjected such portion of catalyst to a slow reduction with the use of gaseous mixture which was 90% nitrogen and 10% hydrogen. The reduction step was initiated in a cool reactor at about 300° F. and fluidized reduction carried out while the reactor was gradually increased to the 1600° F. temperature. A subsequent examination of these slowly reduced catalyst particles showed only 6 mg. of clinker formation present.

EXAMPLE X

In still another test operation, using the catalyst of increased chloride content such as used in the prior examples, there was carried out an eight hour cycling operation, with no hydrogen being present. This gradual reducing procedure provided by the methane in cycling operation resulted in 56 mg. of clinker formation.

EXAMPLE XI

In this test operation, again using the high chloride content alumina-nickel catalyst, there was an initial six hour drying step in the presence of nitrogen at 1600° F. as in the manner of Example VIII, and then subsequently there was an eight hour period of cycling providing the presence of methane. An examination of the thusly dried and slowly reduced composite showed only 25 mg. of clinker formation.

For convenience and comparative purposes, the results of the test operations of the foregoing examples are summarized in the accompanying Table I.

It will be noted in each instance, that for the reducing operations which utilized free hydrogen with both the low and high chloride content catalysts, there was a substantial quantity of clinker formation in a relatively short period of time. Actually, with the catalyst having the 1.25% chloride content, there was the large ball-like mat of clinker which was indicative of very rapid disassociation of nickel from the catalyst and fiber formation therefrom. It may also be noted, particularly with Examples II and XI, that the initial drying step in the presence of nitrogen appeared to have an advantageous effect on lowering the water content in the composite and in turn lowering the amount of clinker formation during the catalyst reducing period. For example, in connection with the test operation of Example II, there were only 43 mg. of clinker formation as compared to 176.5 mg. in Example I where there had been no initial drying step.

Also, in noting those test operations which effected a gradual reduction of the catalyst by the use of a nitrogen diluted hydrogen stream and by the use of a cycling operation which alternated methane introduction with air introduction, there appeared to be a substantial reduction in clinker formation. A comparison of the test operations using the higher chloride content catalyst versus the lower chloride content indicates that there is a definite effect from the chloride content in the composite and its volatilization or disassociation from the catalyst particles. As a result, it appears that a preferred catalyst composite for high temperature hydrogen production in a fluidized manner should contain a minimum amount of chloride ion and preferably below the 0.79% range used in Examples I through VI. By using low chloride content and by carrying out a reduction of the catalyst particles in the presence of a hydrocarbon stream or in the presence of a reduced quantity of free hydrogen, there may be an operation and start-up procedure which will substantially eliminate all clinker formation in the system. Still further, it appears that since water content is critical in permitting the nickel to volatilize or migrate from the composite that a preliminary drying or at least a gradual high temperature reduction should be carried out to permit water formation during the reduction reaction to be dispelled from the system in a gradual manner without accelerating the chloride volatilization which in turn appears to lead to rapid migration of the nickel from the particles.

TABLE I

| Example | Catalyst Type | Percent Chloride | Start-Up Operation | Temp., °F. | Weight of Clinker, mg. |
|---|---|---|---|---|---|
| I | $Al_2O_3$ and 7% Ni | 0.79 | 1 hr. $H_2$ reduction | 1,600 | 176.5 |
| II | do | 0.79 | 6 hrs. $N_2$ drying and 1 hr. $H_2$ reduction. | 1,600 | 43 |
| III | do | 0.79 | 1 hr. of $H_2$ reduction and 5 min. $CH_4$. | 1,600 | 88 |
| IV | do | 0.79 | 1 hr. of $H_2$ reduction and 5 min. cycling. | 1,600 | 67 |
| V | do | 0.79 | 15 min. $CH_4$ (no $H_2$) | 1,600 | 0 |
| VI | do | 0.79 | 480 min. cycling (no $H_2$) | 1,600 | 0 |
| VII | do | 1.25 | 1 hr. $H_2$ | 1,600 | (¹) |
| VIII | do | 1.25 | 6 hrs. $N_2$ drying and 1 hr. $H_2$ reduction. | 1,600 | 774 |
| IX | do | 1.25 | Slow reduction with 90% $N_2$ and 10% $H_2$. | 300 to 1,600 | 6 |
| X | do | 1.25 | 8 hrs. of cycling (no $H_2$) | 300 to 1,600 | 56 |
| XI | do | 1.25 | 6 hrs. $N_2$ drying and 8 hrs. of cycling (no $H_2$). | 300 to 1,600 | 25 |

¹ Large dia 1¼" mass.

I claim as my invention:

1. In a processing system for the production of hydrogen by the fluidized contacting of a normally gaseous hydrocarbon charge stream at decomposition conditions with subdivided catalyst particles containing nickel and not more than 1.25% by weight of chloride, the improved start-up of the process operation to preclude nickel disassociation from the particles and clinker formation in the system, which comprises, effecting an initial heating and thorough drying of the catalyst particles prior to the reduction thereof, maintaining a fluidization of the catalyst particles in the system, gradually introducing a reducing atmosphere into the fluidized particles and thereby effecting a controlled gradual reduction thereof, said reducing atmosphere being selected from the group consisting of a hydrocarbon vapor, a methane-inert gas mixture, and a gaseous mixture comprising an inert gas and from about 1% to about 25% hydrogen.

2. In a processing system for the production of hydrogen by the fluidized contacting of a normally gaseous hydrocarbon charge stream at decomposition conditions with subdivided catalyst particles containing nickel and not more than 1.25% by weight of chloride, the improved start-up of the process operation to preclude nickel disassociation from the particles and clinker formation in the system, which comprises, effecting an initial heating and thorough drying of the catalyst particles prior to the reduction thereof, maintaining a fluidization of the catalyst particles in the system, gradually introducing a reducing gas stream into contact with said fluidized particles and thereby effecting a controlled gradual reduction thereof, and continuing said contacting under a cyclic operation providing in each cycle first a period of contact with said reducing gas stream and then a period of contact with an oxygen containing stream, said reducing gas stream comprising methane and not more than about 25% hydrogen.

3. In a processing system for the production of hydrogen by the fluidized contacting of a normally gaseous hydrocarbon charge stream at decomposition conditions with subdivided catalyst particles containing nickel and not more than 1.25% by weight of chloride, the improved start-up of the processing operation to preclude nickel disassociation from the particles and clinker formation in the system, which comprises, effecting an initial heating and thorough drying of the catalyst particles prior to the initial reduction of such catalyst, maintaining a fluidization of the catalyst with a nitrogen stream, gradually introducing a reducing hydrocarbon stream into the fluidized catalyst particles and effecting the initial reduction thereof in the absence of more than about 25% free hydrogen and at reducing conditions precluding the rapid formation of water and to preclude nickel migration from the catalyst during the reduction thereof and during subsequent decomposition processing of the hydrocarbon charge stream.

References Cited

UNITED STATES PATENTS

| | | | |
|---|---|---|---|
| 2,690,963 | 10/1954 | Herbst | 23—212 XR |
| 2,783,133 | 2/1957 | Eastwood | 23—212 |
| 3,314,761 | 4/1967 | McCartney et al. | 23—212 |
| 3,320,182 | 5/1967 | Taylor et al. | 252—466 |

OSCAR R. VERTIZ, *Primary Examiner.*

EDWARD STERN, *Examiner.*